(No Model.)
J. BORNEISEN & F. SMITH.
BELL HANGING DEVICE.
No. 532,635. Patented Jan. 15, 1895.
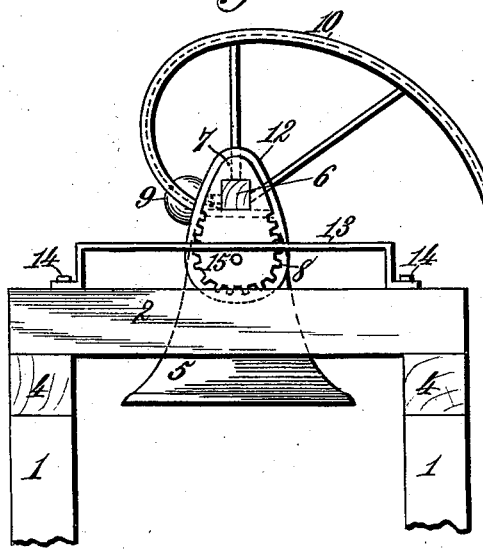
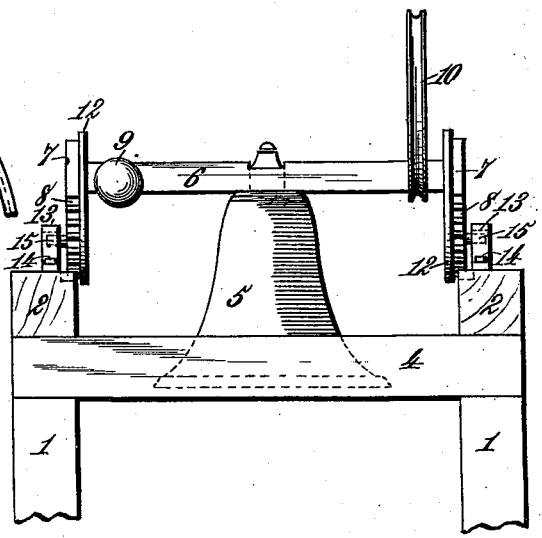
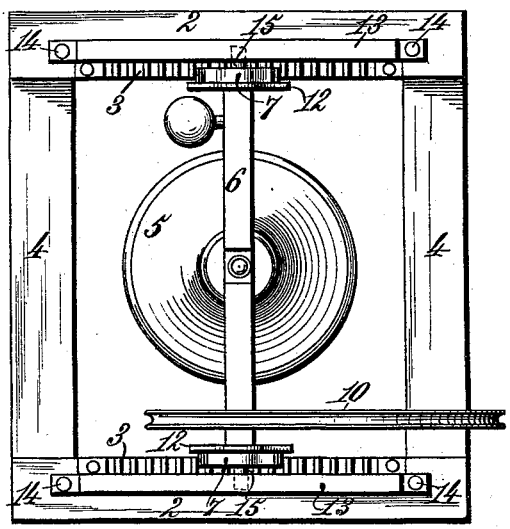
Witnesses:
Robert Everett
G. W. Rea
Inventors:
John Borneisen,
Frank Smith.
By James L. Norris
Atty.

United States Patent Office.

JOHN BORNEISEN AND FRANK SMITH, OF HAZLETON, PENNSYLVANIA.

BELL-HANGING DEVICE.

SPECIFICATION forming part of Letters Patent No. 532,635, dated January 15, 1895.

Application filed November 3, 1894. Serial No. 527,786. (No model.)

*To all whom it may concern:*

Be it known that we, JOHN BORNEISEN and FRANK SMITH, citizens of the United States, residing at Hazleton, in the county of Luzerne and State of Pennsylvania, have invented new and useful Improvements in Bell-Hanging Devices, of which the following is a specification.

This invention has for its object to provide novel, simple, efficient and economical means or devices for hanging large bells designed for churches, factories, schools, and other purposes, whereby the bells are susceptible of being easily vibrated by comparatively slight power applied to shafts from which the bells are suspended.

The invention consists essentially in the combination of a supporting frame provided with a pair of parallel horizontal racks, a pair of oval plates having toothed edges engaging and adapted to rock on the racks, a shaft rigidly connecting said plates, a curved, grooved arm, or lever springing from and extending around the shaft and designed to support a rope or cable, and a bell suspended from the center of the shaft.

The invention also consists in certain other features of construction and combination or arrangement of parts hereinafter described and claimed.

The invention is illustrated by the accompanying drawings, in which—

Figure 1 is an end elevation, showing a bell suspended according to our invention. Fig. 2 is a side elevation of the same; and Fig. 3 is a top plan view of the same.

In order to enable those skilled in the art to make and use our invention, we will now describe the same in detail, referring to the drawings, wherein the numeral 1 indicates uprights or standards, to which are secured parallel, horizontal beams or bars 2, provided with parallel, horizontal racks 3. The beams 2 rest upon beams 4, mounted on the upper ends of the uprights or standards. The bell 5 is suspended from the center of a shaft 6, the extremities of which are rigidly secured to oval-shaped plates 7 having toothed edges 8 engaging and adapted to rock on the horizontal racks 3. The shaft 6 is provided at one end portion in juxtaposition to one of the toothed oval plates 7 with a balance-weight 9, and at the opposite end portion in juxtaposition to the other toothed oval plate with a curved arm or lever 10 which springs from the shaft and extends around the same. The arm or lever 10 is provided with a grooved surface to receive a rope or cable, so that by properly manipulating the rope or cable the toothed oval plates 7 are caused to rock in engagement with the horizontal racks 3. The draft strain on the rope or cable rocks the oval plates in one direction, and the counterbalance-weight aids in rocking the plates in the opposite direction.

The toothed oval plates are provided with guard-flanges 12, which extend a limited distance inside the beams 2 and prevent shifting movements of the toothed oval plates in the direction of the length of the shaft 6. The guard-flanges 12 extend entirely around the toothed oval plates and provide very simple means for preventing laterally shifting movements of the plates on the racks.

For the purpose of retaining the toothed oval plates against vertical displacement and holding them in proper engagement with the horizontal racks, we provide each beam 2 with a guard-bracket 13, attached at its extremities to the beams 2 through the medium of screw-bolts or other fastenings 14. The guards 13 are of a length somewhat greater than the length of the racks 3, and these guards extend over guide-pins 15 projecting laterally from the toothed oval plate 7. When the bell stands in its normal position, as shown in Fig. 1, the laterally projecting guide-pins 15 touch, or nearly touch, the under sides of the guards 13, but the contact is such that the oval-shaped plates are free to rock in engagement with the racks. The laterally projecting pins 15, in connection with the guards 13, lying above said pins, effectually prevent displacement of the toothed oval plates from the racks.

The invention provides a very simple, efficient, and economical construction and arrangement for hanging a large bell, and enables the bell to be very easily vibrated by power applied to the arm, lever, or rope-holder 10, as before explained.

Having thus described our invention, what we claim is—

1. The combination of a supporting frame provided with a pair of parallel horizontal racks, a pair of oval plates having toothed edges engaging and adapted to rock on the horizontal racks, a shaft rigidly connecting the said plates, a rope-holder secured to the shaft, and a bell suspended from the center of the shaft, substantially as described.

2. The combination of a supporting frame provided with a pair of parallel horizontal racks, a pair of oval plates having toothed edges engaging and adapted to rock on the horizontal racks, a shaft rigidly connecting the said plates and provided with a counterbalance-weight, a curved grooved arm or lever springing from and extending around the shaft for supporting a rope or cable, and a bell suspended from the center of the shaft, substantially as described.

3. The combination of a supporting frame provided with a pair of parallel horizontal racks, a pair of oval plates provided with laterally projecting pins and having toothed edges engaging and adapted to rock on the horizontal racks, a shaft rigidly connecting the said plates, guard-brackets extending above the laterally projecting pins of the oval plates, a rope-holder secured to the shaft, and a bell suspended from said shaft, substantially as described.

4. The combination of a supporting frame provided with a pair of racks, a pair of plates having laterally projecting pins and provided with toothed edges engaging the horizontal racks, a shaft rigidly connecting the said plates, a guard-bracket extending over the laterally projecting pins of the toothed plates, a rope-holder extending from the shaft, and a bell suspended from the center of the said shaft, substantially as described.

In testimony whereof we have hereunto set our hands and affixed our seals in presence of two subscribing witnesses.

JOHN BORNEISEN. [L. S.]
FRANK SMITH. [L. S.]

Witnesses:
AUGUST SCHABENER,
EUGENE RILEY.